(12) United States Patent
Massey, Jr.

(10) Patent No.: US 6,792,411 B1
(45) Date of Patent: Sep. 14, 2004

(54) METHOD FOR THE SALE OF MOVIES PRIOR TO THE PRODUCTION THEREOF

(76) Inventor: Eugene Howard Massey, Jr., 550 S. Barrington Ave., #2129, Los Angeles, CA (US) 90049

( * ) Notice: Subject to any disclaimer, the term of this patent is extended or adjusted under 35 U.S.C. 154(b) by 306 days.

(21) Appl. No.: 09/385,226

(22) Filed: Aug. 27, 1999

(51) Int. Cl.[7] .............................................. G06F 17/60
(52) U.S. Cl. ....................................................... 705/35
(58) Field of Search .......................................... 705/35

(56) References Cited

FOREIGN PATENT DOCUMENTS

WO          WO 01/41437     *   6/2001

OTHER PUBLICATIONS

"*The Plain Dealer*" —Film Investments can be more Glitz Than Substance. Oct. 5, 1998 (2 pages).*
"*Successful Farming*" Mar. 1998 (1 page) —Feeder Pig Factories p. H10.*
"Barbers Dividends Looking Good" St. Paul Pioneer Dispatch Jan. 11, 1992 Business Section p. 7C (1 page).*
*Investor Financing of Independent Film* by Cones et al copyright 1998—Chapter 11 (Internet Film Offerings) (pp. 203–205).*
Viewers Choice Canada (1992). The Harold Greenberg Fund's Equity Investment Program created in 1992. (11 pages).*
US News & World Report –v119/v20 –11/95 "Gory to the Mora Orles"–Weiss Leonard.*
Canadian Business v60 p 88 –3/87, 1987 Fergunson, T "Stone Institute –TV Shows & More".*
Screen Finance NY p 10 "Cromwell, Advertiser for Imators in King Lear" Feb. 20, 1997.*
Merritt, G., "Film Production Complete Guide Interactive Work " Now Old TV Hits on the Net, 1999.*
Interactive Work "Now Old TV Hits and on the Net".*
Los Angeles Times "Ventura Country Business:Ventura Country Review; Ventura Studio Company Expand on Its Multimedia Savvy", Dec. 15, 1998.*
The Plain Dealer Oct. 5, 1998 –"Film Investments Can Be More Glitz Than Substance".*
San Francisco Chronicle "High Tech Way To Pitch a Movie"–Dec. 28, 1998.*
HollywoodNetwork.com "American Film Market"–Mar. 1997 –Carrel, Wendy.*
Filmmakers & Financing –Levison–Barnes & Noble –1/98.*
Millimeter Magazine–Mar. 3, 1994 "Interview of Magazine".*

* cited by examiner

*Primary Examiner*—Vincent Millin
*Assistant Examiner*—Sandra Snapp
(74) *Attorney, Agent, or Firm*—Lathrop & Gage LC

(57) ABSTRACT

A method for funding the production of a movie by presenting a storyboard synopsis of the yet-to-be-produced movie on a production company's Internet Web site, and allowing interested potential viewers of the movie to purchase a share of the production company's stock prior to production of the movie. Accompanying the storyboard synopsis is an offer which includes an opportunity to participate in the making of the movie by 'voting' for certain options related to the movie's production, as well as the opportunity to view the production of the movie via video transmission over the Internet. The purchase of a share of production company stock provides the shareholder the right to obtain a free copy of the completed movie as a dividend. The stock purchase is effected preferably by an electronics fund transfer, such as by the entering of a credit card number via the Web site. Production of the movie is not commenced until the number of shares of stock in the production company sold is sufficient to cover the estimated cost of making the movie.

52 Claims, 7 Drawing Sheets

US 6,792,411 B1

METHOD FOR THE SALE OF MOVIES PRIOR TO THE PRODUCTION THEREOF

BACKGROUND OF THE INVENTION

1. Technical Field

The present invention relates generally to the production and distribution of movies, and more particularly, to a method of pre-selling movies to end users of the movies prior to the actual production thereof.

2. Statement of the Problem

There are presently several-problems related to the production of feature length movies, including high production costs, high investment risk, and a high instance of financial failure. Revenues generated from a movie's distribution are often much less than the cost of production. The high cost of producing and distributing feature length movies continues to escalate each year. These ever increasing costs create a commensurate increase in risk for movie investors. A significant percentage of box office failures is largely due to the inability of movie producers to accurately predict the number of tickets that will be purchased. Although various market surveys are presently performed by the movie industry, movie producers have been unable to use these methods to determine what the exact size of the audience for a specific movie will be, and consequently cannot determine whether the number of tickets sold will pay for the cost of production of the movie. Thus, only a small percentage of movies are now profitable.

Furthermore, even in cases where particular movies turn out to be profitable on paper, filmmakers and film investors are often unable to collect their profit share from the distributors of their movies. Distributors of feature films often use "creative accounting" methods for reporting the profits of a movie. Furthermore, the filmmakers and film investors have little or no control over expenses charged against the movie by the distributors. In many instances, a movie's distributor makes a considerable profit, but after the distributor's "expenses" are deducted, the filmmakers and investors do not.

Another significant problem for all filmmakers is "creative meddling" by a studio or distributor. In order to secure financing for their movie, filmmakers are often forced to accept choices for creative elements in a film that prove to be undesirable to the audience. For example, a studio may require a filmmaker to use a certain star in the film, because that star is under contract to the studio or that star can get them greater foreign sales guarantees, and not because that star would best serve the story. Significant creative choices in the making of a movie are often made arbitrarily, by a single individual, without input from the potential audience. To date, there has never been an accurate method for determining if these creative choices in the making of a film are those most desired by the audience.

Since presently known methods of surveying the audience cannot determine, in and of themselves, exactly how many tickets will be purchased for a particular movie, a method is needed for assuring the financial success of a movie, in advance of the movie's production. In addition, a method is needed to insure a movie's critical success by keeping creative choices made by the filmmakers in line with those of the intended audience.

SOLUTION TO THE PROBLEM

The present invention overcomes the aforementioned problems of the prior art and achieves an advance in the field by providing a method for funding the production of a movie by presenting a storyboard synopsis of the movie on a production company's Internet Web site, and allowing interested potential viewers of the movie to purchase a share of the production company's stock prior to production of the movie. The purchase of a share of stock provides the shareholder the right to obtain a free copy of the movie, when completed, as a dividend.

In an effort to secure financing for a movie, "Storyboard synopses" (realistically drawn, sequential series of drawings depicting the action of the story, running concurrently with a narrative description) and "Trailers" (edited sequences filmed from the screenplay that summarize the story) have been shown to potential investors prior to completion of a movie, but never to end user viewers. End user viewers have not heretofore been shown storyboard synopses as a means of securing their investment, because prior to the advent of the Internet, there has never been a cost-effective way to expose an audience to a movie's story line, and then advertise for, and transact, enough individual stock sales to pay for the movie's production costs.

Traditionally, movie producers do not reveal a movie's complete story line and other significant elements thereof in advance of distribution. High risk exists from the producers standpoint because the ultimate audience has no input into the creation of the product, and therefore, the movie content, the specific actors participating in the movie, and the directing thereof, may not be suitable to a sufficiently large number of potential viewers to make the movie profitable. The method of the present invention exposes a movie's ultimate audience to its story line and adapts the story line according to input received from them. In addition, the present method also allows the participants to help determine other aspects of the movie, such as casting, the final story line, selection of the filming location, and the shooting schedule.

In accordance with the present invention, a storyboard synopsis of an unproduced (i.e., uncompleted) movie is first displayed to a potential end user viewer thereof via the Internet Web site of a movie production company. Accompanying the storyboard synopsis is an offer which includes an opportunity to participate in the making of the movie by 'voting' for certain options related to the movie's production, as well as the opportunity to view the production of the movie via live video transmission over the Internet. A potential viewer who decides to participate in the offer then purchases a share of stock in the production company, which entitles the purchaser to receive, in addition to the above opportunities, a free copy of the movie (when completed) as a dividend. The stock purchase is effected preferably by an electronics fund transfer, such as by the entering of a credit card number via the Web site.

The participants in the offer, who, in part, comprise the ultimate audience, use the storyboard synopsis to determine whether to make a purchase of the movie in advance of production. The participants who decide to purchase the stock, and thereby a copy of the movie, become the end users of a product they themselves help create. Production of the movie is not commenced until the number of 'tickets' (i.e., shares of stock in the production company) sold is sufficient to cover the cost of making the movie.

The financial success of the movie is therefore essentially guaranteed because a section of the ultimate movie audience assures that sufficient funding is available to produce the movie by purchasing stock, and thereby copies of the movie prior to production. Upon completion of the movie and delivery to shareholders, the movie's cost of production is paid for, and any future revenues received from screening the movie in worldwide markets are therefore, essentially, gross profit.

The present invention thus provides a method for allowing a filmmaker to maintain financial control of a movie, while eliminating all financial risk from the standpoint of the movie studio investor. Traditionally, a movie studio ('studio') provides 'front money' for the production and distribution expenses of a typical movie. According to one aspect of the present method, a studio and/or a movie distributor ('studio/distributor') invests in a filmmaker's project (i.e., an unproduced movie) by buying stock in the filmmaker's production company. The studio/distributor buys stock in a production which is essentially pre-sold, and therefore owns stock in a project which is already into a profitable phase. If the completed movie is a 'hit', then the production company's stock price would appreciate significantly, thus producing greater profits for the movie studio investor than those derived solely from the usual rentals of a given movie. Furthermore, as described above, a film that does not acquire 'hit' status would still be profitable, because it had already been pre-sold prior to its production.

The purchase of production company stock by studios and distributors is in addition to the purchase of stock by individuals, who may purchase the stock primarily to observe the production of a movie, and to receive a copy of the movie when it is completed. A distributor, such as a video movie rental store chain, may purchase stock primarily for the purpose of acquiring copies of the movie for rental or resale to home viewers, since a free copy of the movie is (ultimately) provided with each share of stock purchased.

An additional advantage provided by the present method is the ability of the production company to maintain control over the creative elements of a movie by retaining the right to decide ultimately which aspects of the movie are tailored in accordance with the options selected by the voting participants. Even though a studio/distributor investor (which may own many thousands of shares of stock) might cast their large voting share for certain options, the individual (public) participants, who collectively control more shares than the studio/distributor, may decide that they want options different from those chosen by the studio/distributor (e.g., different actors). The present method allows the production company to be the ultimate arbiter of which options are to be employed in the actual production of the movie.

DETAILED DESCRIPTION

Figure 1:
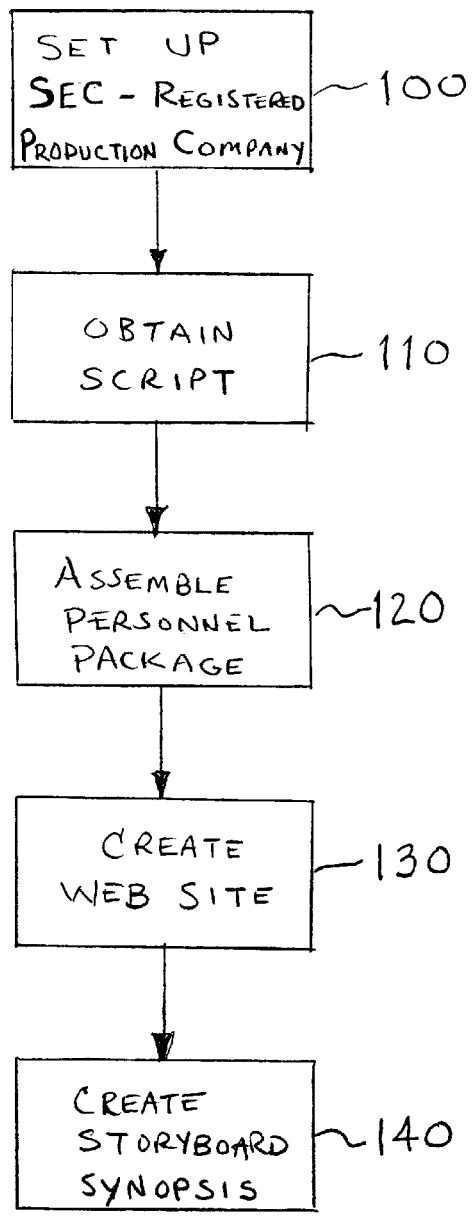
FIG. 1 is a flowchart illustrating preliminary steps which may be taken in order to practice the method of the present invention.

FIG. 1 is a flowchart illustrating preliminary steps which may be taken in order to practice the method of the present invention. In an exemplary aspect of the present invention, as shown in FIG. 1 at step 100, a production company is initially set up as a public company which is registered with the Securities and Exchange Commission (SEC) in all 50 of United States. SEC registration is required because the production company will be making an offer for purchase of stock in a company whose end product is a movie which, at the time of the offering, is not yet produced and therefore constitutes an investment, or a 'security'. Registration is required in all 50 states because the offer is presented over the Internet, and is thus presented to potential purchasers in every state.

The present method operates to provide funding for the production of a movie is by sale of stock in the movie production company, with a copy of the movie as a proposed 'dividend' for each share of stock purchased. One of the methods of payment for the stock is via credit card, and the production company must therefore be in compliance with all federal and state requirements for engaging in the electronic transfer of funds over the Internet, as well as in compliance with applicable regulations governing the sale of securities (i.e., 'stock').

Next, at step 10, the production company must acquire the script for a movie, and/or the public performance and display rights thereto. This can be accomplished by the purchase of an existing screenplay, or by commissioning a literary agent or screen writer to the script.

The next step involves putting together a 'package' for the movie. At step 120, the production company locates the personnel to produce the movie, including a producer, a director, actors, and craftspeople. These people constitute the 'package' which will be exposed to the public via the production company's Internet Web site, after the site is created. This package will provide an incentive for production company Web site viewers to purchase stock, by allowing these potential shareholders to see the credentials of the people responsible for making the movie.

At step 130, the production company creates an Internet Web site capable of integrating the functions of order processing, including handling credit card transactions, stockholder record-keeping, interactive 'dialog' with Web site viewers, and streaming video. One of the initial aspects of this step is obtaining and registering a domain name for the production company Web site. After a selected domain name is determined to be available, the selected domain name is then registered with an appropriate registration authority, such as InterNIC, whose Internet address is http://rs.internic.net/. The architecture of an exemplary production company Web site is described in detail below.

On of the final prerequisites for performing the present method is the creation, at step 140, of a 'storyboard synopsis' 500, which is employed to provide a Web site viewer with information about the movie to be produced. The storyboard synopsis 500 is a group of illustrations with accompanying text which provide a summary description of a movie's character & story elements, plot, and character interactions. The illustrations are drawings or realistic (non-caricature) pictorial representations, which help provide an idea of the overall nature of the movie. The storyboard synopsis is described in detail below with reference to FIG. 5.

Figure 2:
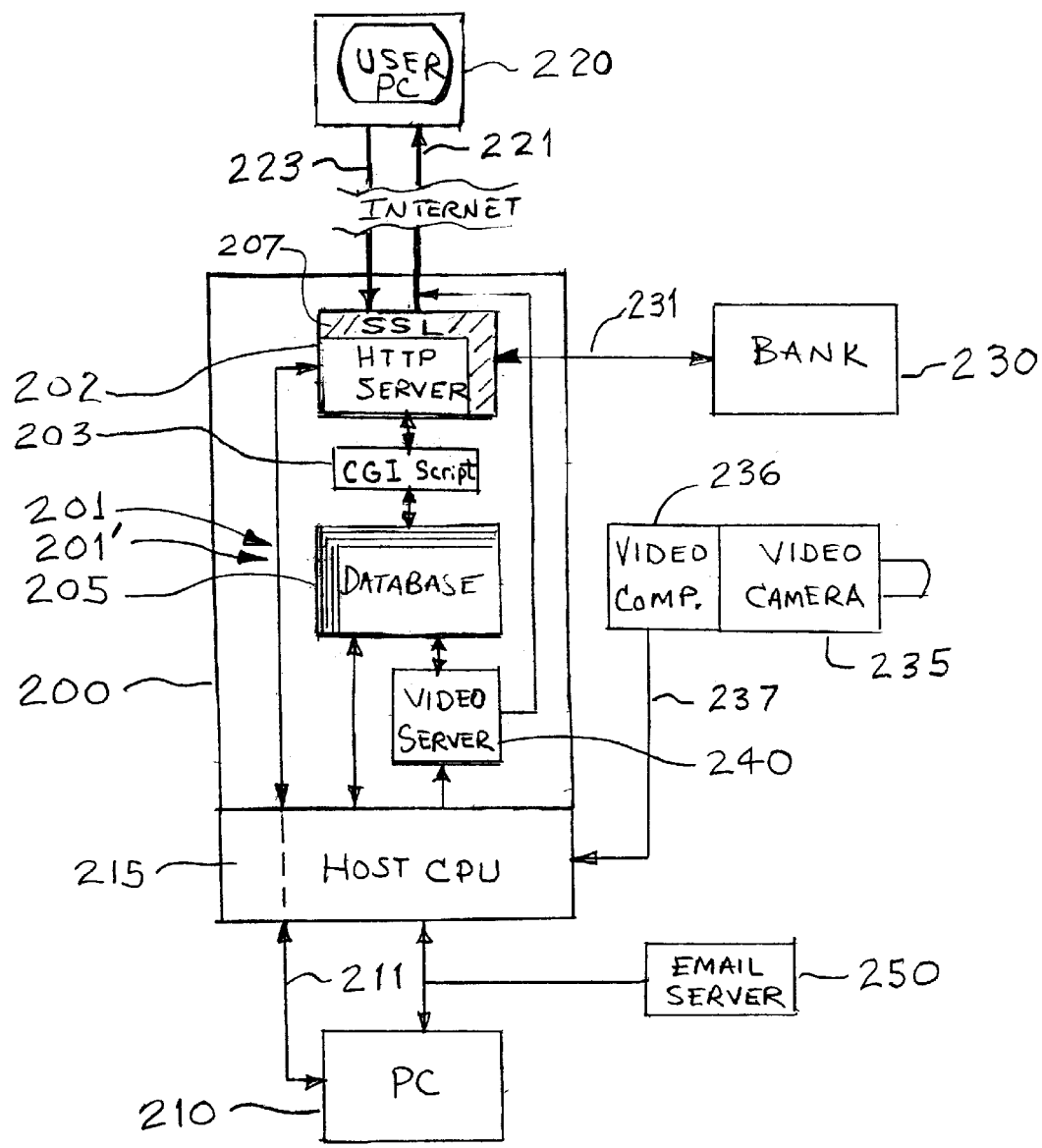
FIG. 2 is a block diagram of the computer-related components which comprise an exemplary system for performing electronic commerce, video streaming, and other Internet-related functions specific to the present method.

FIG. 2 is a block diagram showing some of the computer-related components which comprise an exemplary system for implementing certain Internet-related functions specific to the present method. These Internet functions are handled primarily by the production company Web server 200, which may be located on a computer (CPU) 215 at the production company's location, or at a Web-hosting company's facility. The production company Web server 200 includes an HTTP server 202 for handling the transfer of HTML files (e.g., Web pages) between an Internet user's personal computer (PC) 220 and Web server 200 over the Internet. Web server 200 includes the Web pages and forms, stored in database 205, which are often referred to as a 'Web site'. For the purpose of this document, the term "Web site", when used with reference to the production company Web site, refers specifically to the collection of Web pages in database 205 associated with Web server 200, and is hereinafter referenced as Web site 201. The 'home page', or main Web page, for Web site 201 is referenced as home page 201'.

The production company preferably uses a personal computer (PC) 210 to communicate with Web server 200 over communications line 211, which may be a dial-up connection (i.e., telephone line), or a dedicated line, such as an ISDN or DSL connection. PC 210 is typically connected to a local printer and disk drive (not shown) for printing and storing various records associated with the production company's operation.

In one embodiment of the present invention, a video camera 235 located at the film studio (or at a filming site remote from server 200) is connected to host computer 215 via communications line 237. Video camera is preferably a digital camera which records video in Digital Video (DV) format. Line 237 is preferably capable of supporting a transmission rate of at least 128 kbps, and may be an ISDN or DSL (digital subscriber line) connection, but could alternatively be a 56 kbps dial-up connection, if a suitable video compression scheme is employed and/or a slower video frame rate can be tolerated. Video data of scenes from the movie being produced are preferably compressed by video compression computer 236 before being sent to server 200, where the data is stored in files in database 205. The video compression format may be RealVideo, AVI, or any other suitable video compression scheme. Video server 240 is also used to output selected streaming video data as well as video files or 'clips' to a user PC 220 via the Internet. In order to view streaming video, user PC 220 requires a video "plug-in" (software program) which is compatible with the format used by streaming video server 240 to encode the streamed video. User PC 220 may also be employed for viewing video clips without the requirement of a streaming video plug-in.

In accordance with the present method, purchases of production company offerings are preferably made via the Internet using credit card transactions, but the purchases could, alternatively, be made via other types of electronic funds transfers such as an electronic bank draft, or the like. In one exemplary embodiment, a CGI (Common Gateway Interface) script 203 is used to exchange information between HTTP server 202 and database 205. A CGI script 203 can be used to extract credit card information from a credit card form which has been filled out on a user PC 220 and sent via the Internet to Web server 200. The extracted credit card information can be stored in database 205 and also sent to a bank (or other financial institution) for verification, by use of a CGI script 203. Handling of forms information, including the forms used for providing an interactive dialog with a Web site viewer, may also be accomplished by the use of scripting software such as JavaScript or ActiveX, or by other programming methods.

When a Web site viewer (using PC 220) wishes to purchase stock in the production company (as explained in detail below with reference to FIG. 4), the viewer fills out a form with the appropriate credit card information, and sends the form to the Web server 200. In order to provide a secure transmission of the credit card information from user PC 220 to Web server 200, the data to be transmitted is preferably encrypted. This encryption may be accomplished by means of a protocol such as Secure Sockets Layer protocol (SSL), which is supported by all popular Web browsers. When the encrypted data is received by Web server 200, then SSL layer 207, which can alternatively be a separate SSL or other data encrypting server, decrypts the data and presents it to HTTP server 202. Server 202 may then encrypt the appropriate account information using SSL protocol and transmit the encrypted information via link 231 to bank 230 for verification.

Although transmission paths 223 and 231 are both preferably secured by use of an encryption protocol such as SSL, it is to be noted that other appropriate security mechanisms may also be used to provide secure links for the transmission of credit card information between user PC 220, Web server 202, and bank or financial institution 230. For example, SET (Secured Electronic Transaction) protocol may be used to provide a secure link, or transmission path 231 may be a dedicated telephone line.

It is preferable that PC 210 also be connected to an email server 250 which uses POP (Post Office Protocol); this type of connection is also called a POP account.

Figure 3:
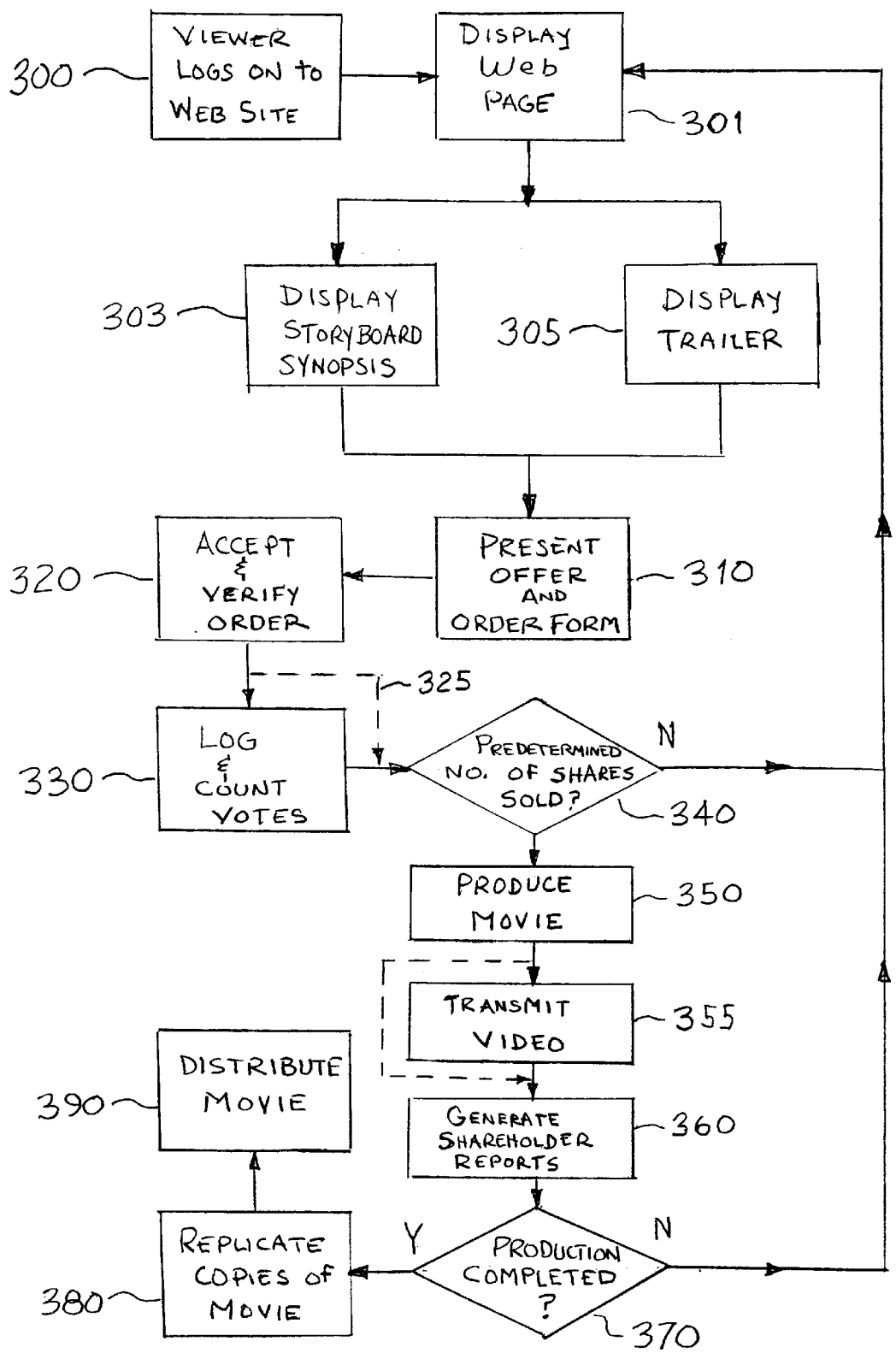
FIG. 3 is a flowchart illustrating, at a high level, the steps involved in practicing one embodiment of the present method.

FIG. 3 is a flowchart illustrating, at a high level, the steps involved in practicing one embodiment of the present method. As shown in FIG. 3, when an viewer logs on to the production company Web site 201 at step 300, the production company home page 201' is displayed, at step 301, which provides the viewer with a number of options, as shown in screen display 600, described below with reference to FIG. 6. These options include viewing a storyboard synopsis 500 of the movie to be produced (hereinafter 'movie'), and viewing a trailer of the movie. If the viewer selects the first option, then at step 303 a storyboard synopsis 500 of the movie is displayed. Storyboard synopsis 500 is explained in detail below with reference to FIG. 5. If the viewer selects the second option, then at step 305 a trailer of the movie is displayed via streaming video or a video file which is downloaded to the viewer.

Figure 7:
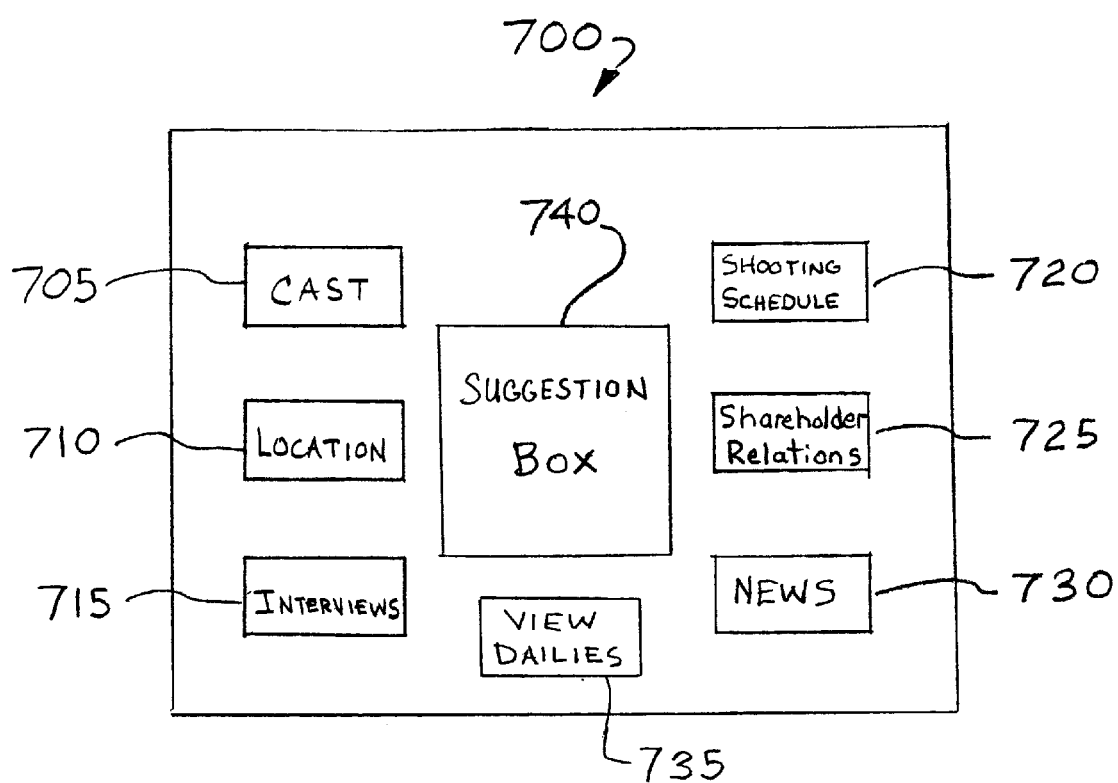
FIG. 7 is a screen display illustrating possible selectable 'member' options in accordance with the present method.

At step 310, an offer for the purchase of production company stock is displayed, either on the Web site home page 201', or on a Web page displayed in response to a viewer request. Accompanying the offer for purchase is an order form which may be immediately filled out with the purchaser's credit card account information, or which may be later sent to the production company's Web site 201 via email. At step 320, an order is received and the account information is verified. After verification of a purchaser's credit card account, the user is permitted to cast 'votes' for various movie production options by making selections from an option menu 700, an example of which is shown in FIG. 7, and described below.

The 'votes' which are cast for the various production options are logged and counted at step 330. Subsequent consideration of these votes may be made when the associated options are selected by the production company. It is to be noted that step 330 may be performed in any order relative to the sequence of steps depicted in FIG. 3 (at any time prior to production of the movie), and, in an alternative embodiment, step 330 may be eliminated from the present method altogether, as indicated by dashed line 325.

At step 340, a determination is made as to whether a predetermined number of shares of production company stock have been sold, or whether the sale of the predetermined number of shares is likely to occur based on an extrapolation of the rate of sale of the stock., in which case, the "predetermined number" is adjusted accordingly. This predetermined number of shares may be calculated to be the number of shares sufficient to finance the estimated costs of production of the movie, or a significant percentage thereof. If the predetermined number of shares have not been sold at this point (i.e., at step 340), then the process described above, in steps 301 to 320, is continued. When the predetermined number of shares of stock have been sold, production of the movie commences at step 350.

At step 355, streaming video and/or video clips of the filming of the movie are transmitted over the Internet to viewers who have purchased production company stock. It is to be noted that the method of the present invention can function absent step 355, and therefore step 355 is optional. Shareholder reports and other reports required by the SEC and state regulatory agencies are generated and electronically distributed via the Internet, at step 360.

The procedure described above with reference to FIG. 3 is repeated until, at step 370, production of the movie is completed. At step 380, physical copies of the movie are replicated onto media such as Digital Video Disk (DVD), and at step 390, the copies are distributed in accordance with the number of shares purchased.

Figure 4:
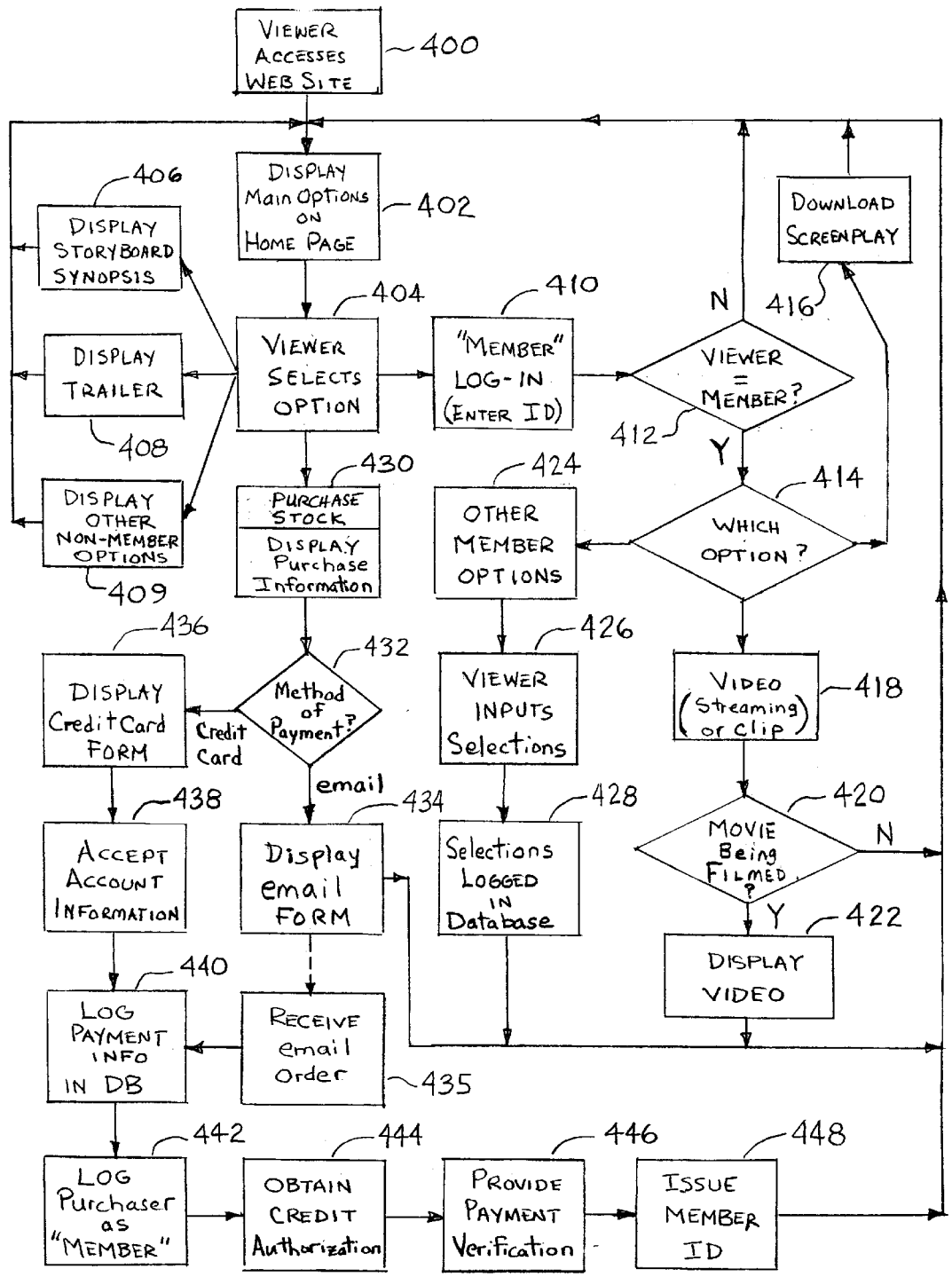
FIG. 4 is a flowchart illustrating possible sequences of actions performed by the production company Web server in response to various inputs from a Web site viewer.
Figure 6:
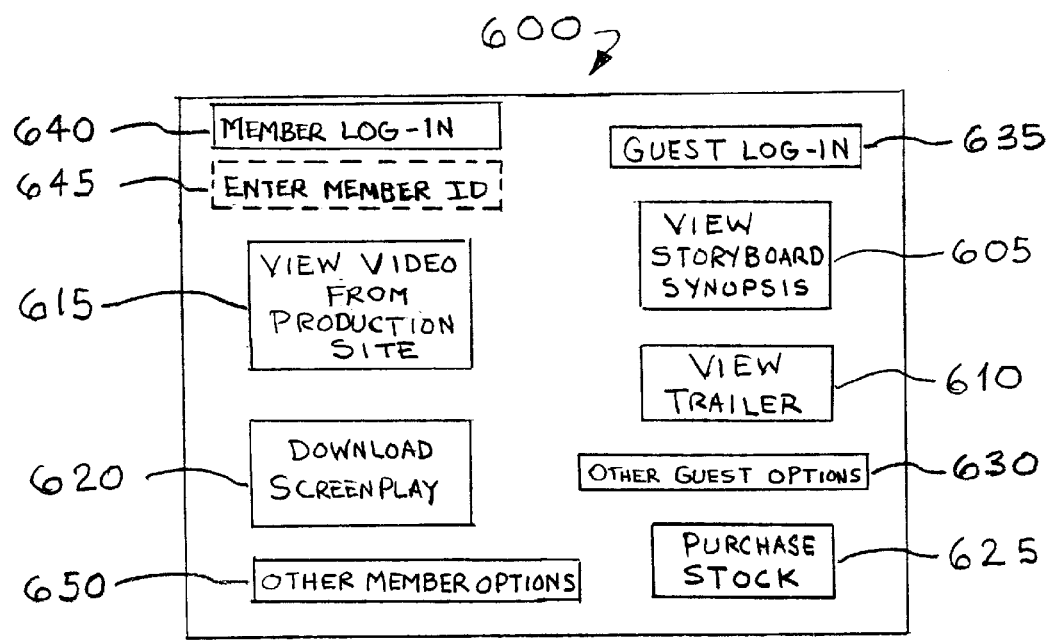
FIG. 6 is a screen display illustrating possible selectable main options in accordance with the present method.

FIG. 4 is a flowchart illustrating possible sequences of actions performed by the production company Web server 202 in response to various inputs from a viewer of the production company Internet Web site 201. As shown in FIG. 4, at step 400, a viewer accesses server 200 on the production company Web site 201. At step 402, various viewer-selectable primary or 'main' options are displayed on the Web site home page 201', or alternatively, a subsequently displayed Web page. An option menu screen display 600 illustrating possible selectable main options is shown in FIG. 6. These main options include "View Storyboard Synopsis" 605, "View Movie Trailer" 610, "Purchase Production Company Stock" 625, "View Video from Production Site" 615, "Download Screenplay" 620, "Other Guest Options" 630, "Member Log-In" 640, and "Other Member Options" 650. The first three of the above options, "View Storyboard Synopsis" 605, "View Movie Trailer" 610, and "Purchase Production Company Stock" 625, are available to any viewer of Web site 201. The fourth and fifth options, "View Video from Production Site" 615, and "Download Screenplay" 620, are made available only to a viewer who is also a 'member', i.e., someone who has already purchased at least one share of production company stock.

The viewer then selects one of the displayed options at step 404. If the "View Storyboard Synopsis" option 605 is selected, then at step 406, a storyboard synopsis 500 of the movie is interactively displayed to the viewer on user PC 220 via the Internet. If the "View Movie Trailer" option 610 is selected, then at step 408, a trailer is downloaded to user PC 220 via streaming video, or alternatively, as a data file. If, at step 404, the viewer selects the "Member Log-In" 640 option, then the viewer is prompted by a displayed message, at step 410, requesting that the viewer enter his or her member identification code ('member ID'). At step 412, the member ID is checked against a list of valid member identification codes in database 205. If, at step 412, the member ID entered by the viewer is not a valid member ID, then the main options are again displayed on user PC 220, at step 402.

If, at step 412, it is determined that the member ID entered by the viewer is valid, then, at step 414, a determination is made as to which of the 'member only' options the viewer has selected. If the "Download Screenplay" option 620 was selected, then at step 416 the entire movie screenplay text is downloaded from database 205 to user PC 220. If the "View Video from Production Site" option 615 was selected, then at step 418, the viewer is prompted by a displayed message indicating whether a video clip or streaming video is available. At step 420, if the movie is presently being filmed, then streaming video data from link 237, or video data recently stored on database 205, is transmitted, at step 422, by streaming video server 240 over the Internet to user PC 220. If, at step 420, no streaming video is available, a video clip (if available) showing recent movie filming events is transmitted, at step 422, as a data file to user PC 220 by server 201 using video data in database 205. If, at step 420, no video information is available (e.g., if production of the movie has not begun), then the main options are again displayed on user PC 220, at step 402.

Returning to step 414, if the viewer has selected "Other Member Options" 650, which allows the viewer to select various movie production options, then at step 424 an option menu 700 is displayed as shown in FIG. 7, which is described in detail below. At step 426, the viewer makes selections from option menu 700. These selections are stored in database 205, at step 428, for later evaluation by the production company.

Returning to step 404, if the "Other Guest Options" choice 630 is selected, then at step 409, an option menu similar to that of menu 700 is displayed on user PC 220. However, The choices for non-shareholders would be non-interactive and provide for viewing only.

At step 404, if the viewer has selected the "Purchase Production Company Stock" option 625, then, at step 430, then an informational Web page (not shown) is displayed which provides further information, including a disclaimer, regarding the purchase of production company stock. The information displayed at step 430 also indicates that the stock purchase may be made by credit card by filling out a form, which is displayed when the viewer clicks on a button appearing on the informational Web page. The form accepts credit card account information from the viewer and is transmitted to Web server 200 upon completion by the viewer. The credit card account information is embedded in the form is transmitted directly back to HTTP server 201, or alternatively, by email to email server 250. If the viewer's credit card account information is sent via email, then at step 434, a stock purchase form is sent to user PC 220, and then the main options are again displayed, at step 402. The account information is processed at a later time (at step 435) when the email form is received by the production company's email server 250.

If the viewer's credit card account information is sent directly to server 201, then at step 438, the received account information (which is in HTML format at this point) is stripped from the received form by a CGI script 203 (or JavaScript, or the like), which performs the functions described in steps 440, 442, and 444. The credit card account information is optionally, but preferably, encrypted, using SSL protocol, by the Web browser in user computer 220, before being sent to production company Web server 201. When the account information is received by Web server 201, if the information has been encrypted, then the account information is decrypted by SSL layer 207.

At step 440, the received credit card account information is logged into database 205; at step 442, the purchaser is logged in database 205 as a 'member'; and at step 444, the account information is encrypted via SSL layer 207 sent to bank 230 for verification via link 231. Assuming the credit card account information is valid, bank 230 then provides authorization of the transaction back over link 231.

Figure 5:
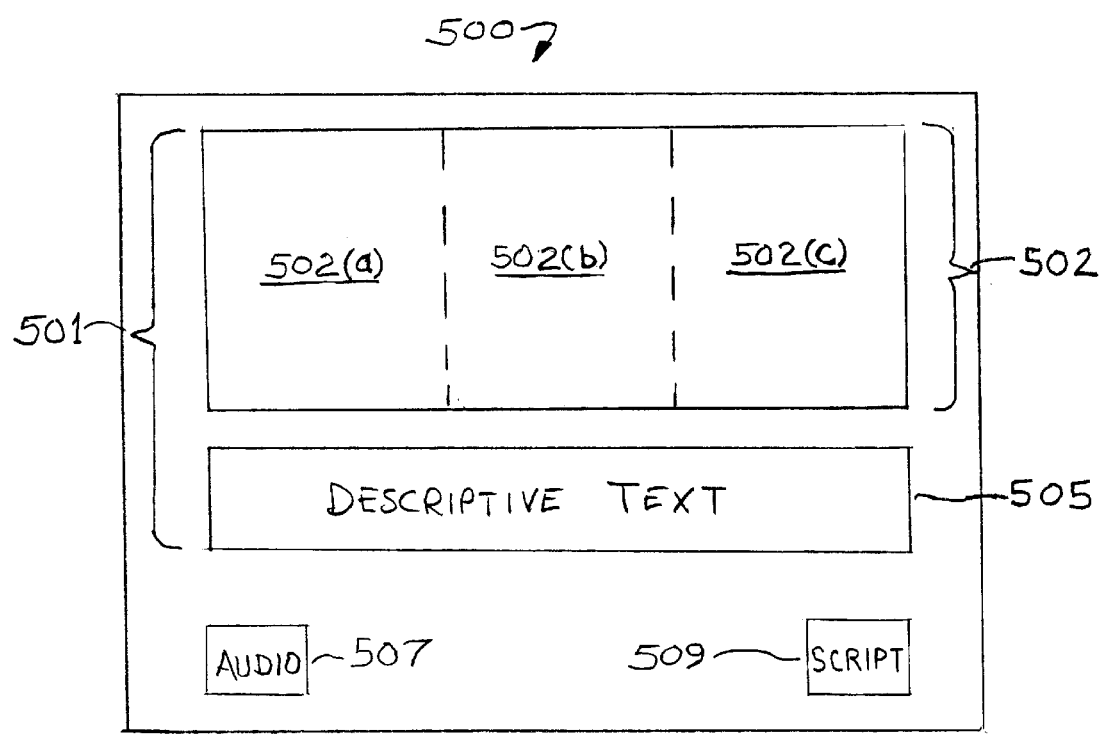
FIG. 5 is a diagram showing one frame of a storyboard synopsis.

At step 446, server 201 sends payment verification to the viewer/stock purchaser at user computer 220, and at step 448, also sends the viewer/purchaser a member ID or code. It is to be noted that the order of the steps set forth above may be altered without affecting the operation of the invention;

FIG. 5 is a diagram showing one frame 501 of a storyboard synopsis 500 as it might appear on a display terminal connected to user PC 220. A storyboard synopsis 500 is a group of illustrations with accompanying text which provide a summary description of a movie's character & story elements, plot, and character interactions. The illustrations can be drawings or realistic (non-caricature) pictorial representations, which help provide an idea of the overall nature of the movie.

Storyboard synopsis 500 thus includes a pictorial summary of the movie comprising a sequence of frames 501, wherein each of the frames 501 preferably comprises an image 502 (i.e., an 'illustration') representing at least one scene from the movie and descriptive text 505 associated with the scene. Image 502 is preferably a color image which may be one or more drawings or 'still' photographic images representing scenes 502(a)–502(n). Image 502, as shown in FIG. 5, includes three scenes, as indicated by reference numbers 502(a), 502(b), and 502(c); however, image 502 may contain any number of scenes 502(n).

Optionally, image 502 may be a short sequence of video frames 501 (with or without descriptive text 505) which provide one or more animated scenes from the movie. The animated video frame sequence may be stored in database 205 in a format such as a "Quick Time" or AVI video clip. An audio dialog associated with each scene 502(n) may accompany the pictorial summary. Storyboard synopsis 500 may optionally include a "button" 509 associated with the scene, for displaying part of a script associated with the scene 502(n), and/or a button 507 for initiating a recorded audio dialog associated with the scene. The animated video scenes and audio dialog are reproduced, or 'played', by the appropriate plug-in in Web browser in user PC 220.

FIG. 6 is an 'option menu' screen display 600 illustrating possible selectable main options in accordance with the present method. Option menu 600 is presented to user computer 220 when a viewer accesses server 200 on the production company Web site 201. The viewer-selectable primary or 'main' options are displayed on the Web site home page 201', or alternatively, a subsequently displayed Web page. Possible selectable main options (which are represented on option menu 600 as "buttons") include "View Storyboard Synopsis" 605, "View Movie Trailer" 610, "View Video from Production Site" 615, "Download Screenplay" 620, "Purchase Production Company Stock" 625, "Other Guest Options" 630, "Other Member Options" 650, "Guest Log-In" 635, and "Member Log-In" 640.

All of the above options are described above with reference to FIG. 4, with the exception of "Guest Log-In" option 635, which, if implemented, takes the user to an informational Web page (not shown) which provides an overview of the production company's operation and a sales message describing the benefits of becoming a shareholder. This informational Web page would contain the necessary SEC compliance documents and disclaimers, complying with all the rules of a stock purchase on the Internet. After reading through all these documents, a viewer could click another button to "purchase" one or more shares of stock and then would enter an electronic transaction sequence (described with reference to FIG. 4, steps 436–446, wherein the stock share or shares are actually purchased.

FIG. 7 is an 'option menu' screen display 700 illustrating possible selectable 'member' options (represented on option menu 700 as "buttons") in accordance with the present method. Option menu 700 is displayed when the viewer selects "Other Member Options" 650 which allows selection of various options which are made available only to a viewer who is also a 'member', i.e., someone who has already purchased at least one share of production company stock.

If "Cast" option 705 is selected, member viewers are presented with a screen display listing approximately 10 to 15 characters from the film, with approximately 5 to 10 photographs and biographical sketches of celebrity actors displayed in proximity to each character role. Located near each photograph is a box providing an option for entering the viewer's member ID to 'choose' the actor in the photograph for the particular role. The member ID is recorded in database 205, and tallied (as a 'vote') along with the choices made by other members. After the vote is tallied along with the previous votes, the total votes for each actor are then displayed. Each member may vote with their code number only once, but may still enter the page with their code number on subsequent visits to check on the casting situation resulting from other's votes. Voting is suspended and the cast "locked in" at some point prior to filming the movie. A disclaimer is preferably displayed on the "Cast" screen display, stating, in essence, that "while every effort would be made to secure an actor most desired by the largest number of people, the producers may in fact not be able to deliver the Shareholders' choice to actually play a role in the film."

If "Location" option 710 is selected, members have the option of not only seeing photos and possibly streaming video of the proposed filming locations, but in addition, using a system described above with respect to option 705, the members may also vote for a location where they would like the movie to be filmed.

If "Interviews" option 715 is selected, members are able to select interviews with certain stars of the movie, recorded during the filming. "Shooting Schedule" option 720 allows members to review the actual filming schedule of the movie. If "Shareholder Relations" option 725 is selected, members (who are shareholders) may communicate with the production company about stock-related matters via email. "News" option 730 allows members to receive daily news briefings during the movie's production. "View Dailies" option 735 allows members to view a video clip or streaming video of the film footage shot on a given day. "Suggestion Box" option 740 allows members to offer their ideas and feedback to the production company during the making of the movie.

It is to noted that the above list of options on option menus 600 and 700 is merely exemplary, and more or fewer options than those listed may be present on the option menus or may appear on additional screen displays.

While preferred embodiments of the present invention have been shown in the drawings and described above, it will be apparent to one skilled in the art that various embodiments of the present invention are possible. For example, the specific configuration of the Web server, the format and contents of the screen displays, as well as the particular options made available to end user viewers described herein should not be construed as limited to the specific embodiments described herein. Modification may be made to these and other specific elements of the invention without departing from its spirit and scope as expressed in the following claims.

I claim:

1. A method for financing production of a movie, via a sale of a security, comprising the step of:

displaying a synopsis of the movie, not yet produced, on an Internet Web site, wherein the synopsis comprises a group of illustrations with accompanying narrative description of the movie's story line; and providing a mechanism comprising the sale of the security, which is an investment in the not yet produced movie, presented via the Web site, wherein a single copy of the movie is offered as a dividend for each said security to a viewer of the Web site, prior to completion of the production of the movie.

2. The method of claim 1, wherein said viewer is an end user viewer.

3. The method of claim 1, wherein said synopsis is a storyboard synopsis.

4. The method of claim 1, wherein said storyboard synopsis includes a pictorial summary of the movie comprising a sequence of frames, wherein each of said frames comprises:

an image representing at least one scene from the movie; and text associated with the scene.

5. The method of claim 4, wherein said image is a drawing.

6. The method of claim 4, wherein said image is a photographic image.

7. The method of claim 6, wherein said photographic image is one of a sequence of video images which, when displayed, provides animation of the scene.

8. The method of claim 4, wherein an audio dialog associated with the scene accompanies the pictorial summary.

9. The method of claim 4, wherein said storyboard synopsis includes a "button", associated with the scene, for displaying a script associated with the scene.

10. The method of claim 4, wherein said storyboard synopsis includes a "button", associated with the scene, for initiating an audio dialog associated with the scene.

11. The method of claim 4, wherein said storyboard synopsis includes a pictorial summary of the movie comprising a sequence of frames, wherein each of said frames comprises an image representing at least one scene from the movie.

12. The method of claim 1, wherein said mechanism includes the purchase of at least one share of stock in a production company associated with the production of the movie.

13. The method of claim 1, wherein said storyboard synopsis includes a pictorial summary of the movie comprising a sequence of frames, wherein each of said frames comprises:

an image representing at least one scene from the movie; and audio dialog associated with said at least one scene.

14. The method of claim 1, further comprising the step of displaying, via the Internet Web site, video images of activities relating to the movie as the movie is being produced.

15. The method of claim 1, wherein said mechanism includes an electronic funds transfer.

16. The method of claim 15, wherein said electronic funds transfer comprises a credit card transaction.

17. The method of claim 1, wherein said synopsis is a trailer of the movie.

18. The method of claim 1, further comprising the step of distributing the movie to the potential viewers who have purchased the movie.

19. The method of claim 18, wherein the step of distributing the movie includes distributing copies of the movie in the form of a digital video disk.

20. A method for enabling potential viewers of a movie, financed via a sale of a security, to interactively participate in production of the movie, the method comprising the steps of:

displaying a synopsis of the movie, not yet produced, on an Internet Web site, wherein the synopsis comprises a group of illustrations with accompanying narrative description of the movie's story line;

providing a mechanism comprising the sale of the security, which is an investment in the not yet produced movie, via the Internet Web site, for purchase of the movie as a dividend by potential viewers thereof in advance of completion of production of the movie;

displaying to the potential viewers, via the Internet Web site, selectable options related to the production of the movie;

receiving, from a plurality of the potential viewers, input related to the selectable options; and producing the movie in accordance with aspects of the input received from the potential viewers.

21. The method of claim 20, further comprising the step of distributing the movie to the potential viewers who have purchased the movie.

22. The method of claim 21, wherein the step of distributing the movie includes distributing copies of the movie in the form of a digital video disk.

23. The method of claim 20, further comprising the step of displaying, via the Internet Web site, video images of activities relating to the movie as the movie is being produced.

24. The method of claim 20, wherein the potential viewers are end user viewers of the movie.

25. The method of claim 20, wherein said storyboard synopsis includes a pictorial summary of the movie comprising a sequence of frames, wherein each of said frames comprises:

an image representing at least one scene from the movie; and text associated with the scene.

26. The method of claim 20, wherein said mechanism includes the purchase of at least one share of stock in a production company associated with the production of the movie.

27. A method for financing production of a movie, via a sale of a security prior to completion of the movie, the method comprising the steps of:

displaying a synopsis of the movie, not yet produced, on an Internet Web site, wherein the synopsis comprises a group of illustrations with accompanying narrative description of the movie's story line;

presenting an offer, via an Internet Web site, whereby viewers of the Web site may receive a copy of the movie as a dividend by purchasing, prior to the production of the movie, the security, which is an investment in the not yet produced movie, represented as a share of stock in a production company associated with the production of the movie; and producing the movie when a predetermined number of shares of said stock have been purchased.

28. The method of claim 27, wherein said viewers are end user viewers.

29. The method of claim 27, further comprising the step of displaying a synopsis of the movie on the Internet Web site prior to completion of the production of the movie.

30. The method of claim 29, wherein said synopsis is a trailer of the movie.

31. The method of claim 29, wherein said synopsis is a storyboard synopsis which includes a pictorial summary of the movie comprising a sequence of frames, wherein each of said frames comprises:

an image representing at least one scene from the movie; and text associated with the scene.

32. The method of claim 31, wherein said image is a drawing.

33. The method of claim 31, wherein said image is a photographic image.

34. The method of claim 33, wherein said photographic image is one of a sequence of video images which, when displayed, provide animation of the scene.

35. The method of claim 31, wherein an audio dialog associated with the scene accompanies the pictorial summary.

36. The method of claim 31, wherein said storyboard synopsis includes a "hot button", associated with the scene, for displaying a script associated with the scene.

37. The method of claim 31, wherein said storyboard synopsis includes a pictorial summary of the movie comprising a sequence of frames, wherein each of said frames comprises an image representing at least one scene from the movie.

38. The method of claim 29, wherein said synopsis is a storyboard synopsis which includes a pictorial summary of the movie comprising a sequence of frames, wherein each of said frames comprises:

an image representing at least one scene from the movie; and audio dialog associated with said at least one scene.

39. The method of claim 27, wherein said stock is purchased via an electronic funds transfer.

40. The method of claim 39, wherein said electronic funds transfer comprises a credit card transaction.

41. The method of claim 27, further comprising the step of displaying, via the Internet Web site, video images of activities relating to the movie as the movie is being produced.

42. A method for producing a movie, financed via a sale of a security prior to completion of the movie, comprising the steps of:

displaying a synopsis of the movie, not yet produced, on an Internet Web site, wherein the synopsis comprises a group of illustrations with accompanying narrative description of the movie's story line;

presenting an offer, comprising the sale of the security, which is an investment in the not yet produced movie, via an Internet Web site, whereby a viewer of the Web site may receive a copy of the movie by making a purchase of the security represented as a single share of stock which includes the movie as a dividend, wherein said purchase is made prior to the production of the movie;

producing the movie when a predetermined number of said purchases have been made; and displaying, via the Internet Web site, video images of activities relating to the movie as the movie is being produced.

43. The method of claim 42, further comprising the steps of:

displaying to the potential viewers, via the Internet Web site, selectable options related to the production of the movie;

receiving, from a plurality of the potential viewers, input related to the selectable options; and producing the movie in accordance with aspects of the input received from the potential viewers.

44. The method of claim 42, wherein said synopsis includes a pictorial summary of the movie comprising a sequence of frames, wherein each of said frames comprises:

an image representing at least one scene from the movie; and text associated with the scene.

45. The method of claim 42, wherein said purchase comprises purchasing, via a credit card transaction, stock in a production company associated with the movie.

46. A method for financing production of a movie, via a sale of a security by a production company comprising the steps of:

displaying a synopsis of the movie, not yet produced, on an Internet Web site, wherein the synopsis comprises a group of illustrations with accompanying narrative description of the movie's story line;

displaying an offer for purchase of the security, which is an investment in the not yet produced movie, represented as stock in the production company, wherein a copy of the movie, when produced, is provided as a dividend for the purchase of each share of said stock; and processing a payment for said stock by an electronic funds transfer.

47. The method of claim 46, further comprising the step of producing the movie when a predetermined number of shares of said stock have been purchased.

48. The method of claim 46, wherein said synopsis is a storyboard synopsis including a pictorial summary of the movie comprising a sequence of frames, wherein each of said frames comprises:

an image representing at least one scene from the movie; and text associated with the scene.

49. The method of claim 46, wherein said synopsis is a storyboard synopsis which includes a pictorial summary of the movie comprising a sequence of frames, wherein each of said frames comprises:

an image representing at least one scene from the movie; and audio dialog associated said at least one scene.

50. The method of claim 46, wherein said synopsis is a trailer of the movie.

51. The method of claim 46, further comprising the step of displaying, via the Internet Web site, video images of activities relating to the movie as the movie is being produced.

52. The method of claim 46, wherein said electronic funds transfer comprises a credit card transaction.

* * * * *